United States Patent [19]

Lewis

[11] Patent Number: 5,867,995
[45] Date of Patent: Feb. 9, 1999

[54] ELECTRONIC CONTROL OF REFRIGERATION SYSTEMS

[75] Inventor: Robert J. Lewis, Ellicott City, Md.

[73] Assignee: Energy Controls International, Inc., Hunt Valley, Md.

[21] Appl. No.: 778,541

[22] Filed: Jan. 3, 1997

Related U.S. Application Data

[63] Continuation of Ser. No. 502,450, Jul. 14, 1995, abandoned.

[51] Int. Cl.$^6$ .............................. F25B 41/04; F25B 1/00
[52] U.S. Cl. ................................ 62/115; 62/206; 62/217
[58] Field of Search ............................ 62/217, 115, 204, 62/206

[56] References Cited

U.S. PATENT DOCUMENTS

| | | | |
|---|---|---|---|
| 3,003,331 | 10/1961 | Coburn et al. ...................... | 62/206 X |
| 3,564,865 | 2/1971 | Spencer et al. ........................... | 62/217 |
| 3,698,204 | 10/1972 | Schlotterbeck et al. .................. | 62/206 |
| 5,182,920 | 2/1993 | Matsuoka et al. ..................... | 62/223 X |
| 5,247,806 | 9/1993 | Ebisu et al. ........................ | 62/228.3 X |
| 5,533,347 | 7/1996 | Ott et al. .................................... | 62/115 |
| 5,572,879 | 11/1996 | Harrington et al. ....................... | 62/217 |

Primary Examiner—William E. Wayner
Attorney, Agent, or Firm—Fish & Richardson P.C.

[57] ABSTRACT

A refrigeration system comprises an evaporator having an inlet and an outlet, a condenser, a compressor that is located between the evaporator and the condenser and that provides suction pressure at the evaporator outlet, an expansion valve that is connected to the evaporator inlet and that is operable to regulate a flow of refrigerant into the evaporator, a pressure regulator that is connected to the evaporator outlet and that is operable to limit the suction pressure to a regulated value, and a controller that coordinates operation of the pressure regulator with operation of the expansion valve.

29 Claims, 5 Drawing Sheets

ELECTRONIC CONTROL OF REFRIGERATION SYSTEMS

This application is a file wrapper continuation of U.S. application Ser. No. 08/502,450, filed Jul. 14, 1995, now abandoned.

FIELD OF THE INVENTION

This application relates to controlling refrigeration systems.

BACKGROUND OF THE INVENTION

Refrigeration systems are used to cool an enclosed area, such as a house or a food storage case, by removing heat from the air in the enclosed area and releasing the heat outside the enclosed area. In a typical refrigeration system, a highly-pressurized liquid refrigerant, such as freon, is introduced into a low-pressure environment in the enclosed area and allowed to evaporate, or "boil," thereby drawing heat from the enclosed area. The superheated vapor is then compressed and condensed outside the refrigerated area, releasing the heat removed from the refrigerated area.

Figure 1:
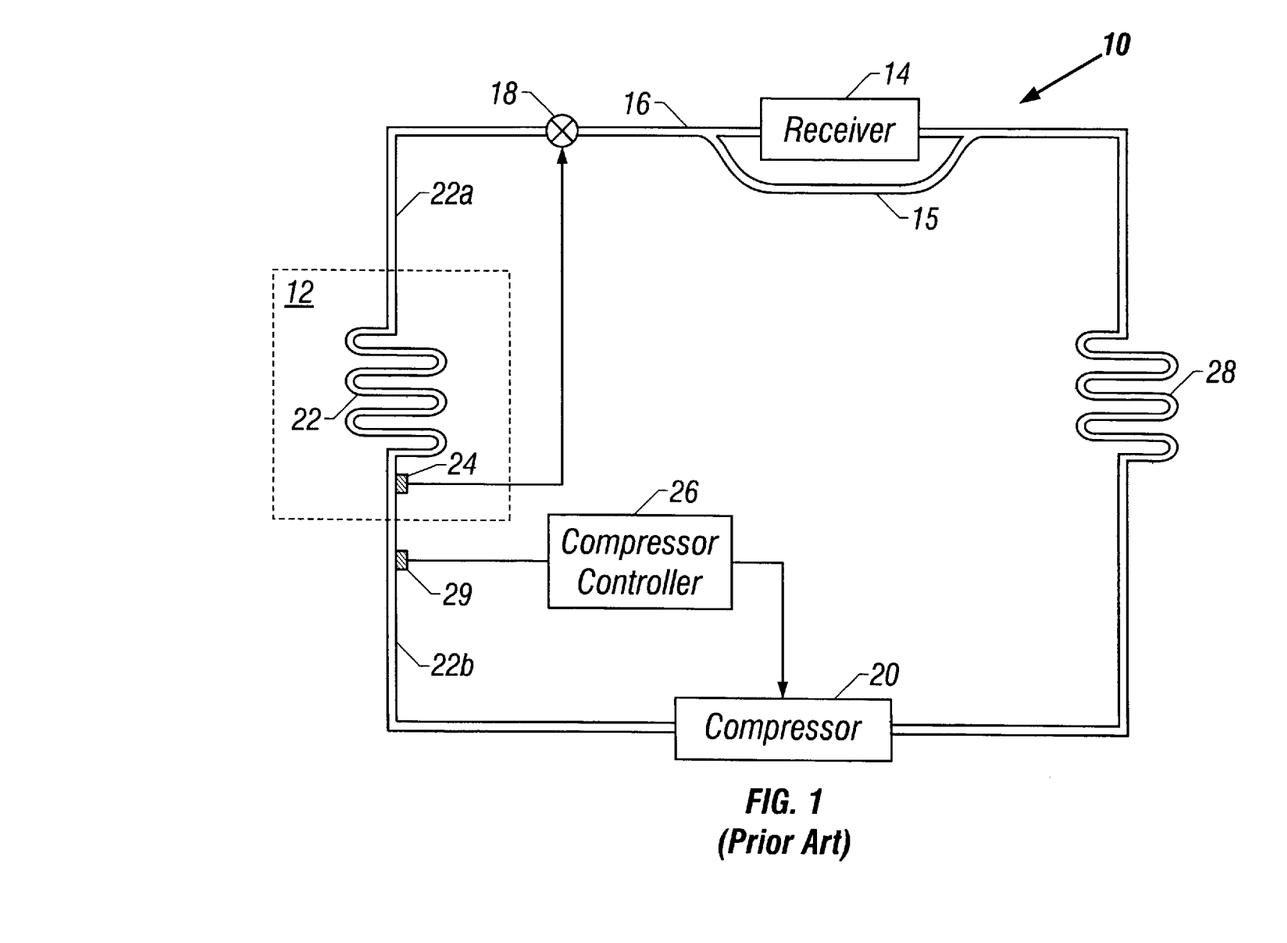
FIG. 1 is a schematic diagram of a conventional refrigeration system.

FIG. 1 shows a typical refrigeration system 10 used to cool a food storage case 12. Highly pressurized liquid refrigerant is released from a receiver vessel 14 into a pipe 16, or it may bypass the receiver vessel 14 through a bypass line 15. A valve 18, such as an expansion valve, provides an orifice in the pipe 16 that opens and closes to restrict the flow of liquid refrigerant, creating a high pressure region between the valve 18 and the receiver vessel 14. As the refrigerant passes through the expansion valve 18, it encounters lower pressure in the evaporator coil 22 and begins to evaporate. Because evaporation is an endothermic process, the refrigerant pulls heat from the surroundings of the evaporator coil 22 (i.e., the food display case) as it evaporates. A compressor system 20 provides suction pressure at the coil outlet that, when properly controlled, helps ensure that the last bit of liquid refrigerant evaporates just before it leaves the evaporator coil 22 (i.e., that the entire coil 22 is used to remove heat from the case 12). The compressor system 20 then pressurizes the vaporous refrigerant and discharges it to a condenser coil 28, where the refrigerant condenses. Because condensation is an exothermic process, the refrigerant releases the heat removed from the food storage case 12 as the refrigerant returns to the liquid state.

In general, a refrigeration system designer strives to accomplish several important goals, including the following. First, the system should maintain the temperature of the refrigerated area at a substantially constant level. Second, the system should use the entire length of the evaporator coil to boil refrigerant (i.e., maximize coil efficiency) and, at the same time, to ensure that no liquid refrigerant enters the compressor system. Third, the system should maintain suction pressure at the highest possible level.

In the system 10 of FIG. 1, the expansion valve 18 attempts to maximize the efficiency of the evaporator coil 22 by maintaining a predetermined temperature difference across the coil 22. The valve 18 measures coil temperature (or inlet pressure) at the coil inlet 22a, and a temperature transducer 24 measures coil temperature at the coil outlet 22b. If the temperature difference across the coil 22 is too high, all of the refrigerant is evaporating before it reaches the end of the coil 22, and thus the coil 22 is not operating efficiently. If the temperature difference is too low, liquid refrigerant is escaping the coil 22, thereby wasting refrigeration potential, and possibly entering the compressor 20.

The system 10 attempts to stabilize the temperature difference across the coil 22 by increasing or decreasing the duty cycle of the valve 18 to accordingly adjust the flow of refrigerant into the evaporator 22. When the refrigerant is boiling too rapidly, the expansion valve's duty cycle is increased to allow more refrigerant to enter the coil 22; and when liquid refrigerant is escaping the coil 22, the duty cycle of the expansion valve 18 is reduced to reduce the flow of refrigerant into the coil 22. The valve 18 may be a spring-loaded valve, a mechanical expansion valve, or an electronic expansion valve, all of which are known in the art and are not described in detail here.

Suction pressure, and therefore evaporator temperature and case temperature, are controlled by the compressor system 20. When the case temperature deviates from a predetermined value, the compressor system 20 may increase or decrease suction pressure to alter the amount of refrigerant that evaporates, and thus the amount of heat removed, in the evaporator coil 22. Because the compressor system 20 must expend energy to pressurize the refrigerant flowing into the condenser coil 28, the compressor system 20 should maintain the highest possible suction pressure. As suction pressure falls, the compressor system 20 must work harder to maintain discharge pressure to the condenser coil 28, and as suction pressure rises, the compressor system 20 may reduce its work and still maintain discharge pressure. The compressor system 20 also affects case temperature by cutting on and off at appropriate times. The compressor system 20 is controlled by a controller 26 that receives as input the case temperature and the output of a suction pressure transducer 29.

The compressor system may service several food storage cases and thus several evaporator coils. In this situation, each evaporator coil requires a separate expansion valve, but all coils are subject to the same suction pressure. Furthermore, the compressor may be replaced by a group of compressors which are operated in tandem to enhance the refrigeration system.

SUMMARY OF THE INVENTION

In one aspect, the invention relates to a refrigeration system that includes an evaporator having an inlet and an outlet; a condenser; a compressor, located between the evaporator and the condenser, that provides suction pressure at the evaporator outlet; an expansion valve, connected to the evaporator inlet, that is operable to regulate a flow of refrigerant into the evaporator; a pressure regulator, connected to the evaporator outlet, that is operable to limit the suction pressure to a regulated value; and a controller that coordinates operation of the pressure regulator with operation of the expansion valve.

Embodiments of the invention may include one or more of the following features. The expansion valve may be an electronic expansion valve, and the pressure regulator may be an electronic pressure regulator. The controller may configure the expansion valve to maintain a predetermined refrigeration parameter in the refrigeration area. The predetermined refrigeration parameter may be the temperature in the refrigerated area or the temperature difference across the evaporator. The controller also may configure the expansion valve to achieve a maximum refrigerant flow rate while the expansion valve maintains the predetermined refrigeration parameter. The controller may configure the pressure regulator to achieve the highest possible suction pressure that allows the expansion valve to maintain the predetermined refrigeration parameter. The controller may further coordinate operation of the compressor with operation of the pressure regulator, such as by configuring the compressor to provide a suction pressure no greater than the regulated value. The refrigeration system may include refrigeration subloops each having an evaporator in connection with an expansion valve.

In another aspect, the invention relates to a method of controlling a refrigeration system having an expansion valve that regulates a flow of refrigerant into an evaporator in a refrigerated area and a pressure regulator that regulates suction pressure provided to the evaporator by a compressor. The expansion valve is adjusted to achieve a predetermined refrigeration parameter in the refrigeration area, and operation of the pressure regulator is coordinated with operation of the expansion valve to maximize system efficiency.

Embodiments of the invention may include one or more of the following features. An actual refrigeration parameter may be measured in the refrigerated area and then used to adjust the expansion valve. The actual refrigeration parameter may be the temperature in the refrigerated area or the temperature difference across the evaporator. The expansion valve may be operated to achieve maximum refrigerant flow rate while maintaining the predetermined refrigeration parameter. The pressure regulator may be operated to achieve the highest suction pressure that allows the expansion valve to maintain the predetermined refrigeration parameter.

In another aspect, the invention relates to a refrigeration system having a main refrigeration loop and a plurality of refrigeration subloops, each of which services at least one refrigerated area. The refrigeration system includes a plurality of evaporators, at least one of which is located in each refrigerated area; a plurality of expansion valves, each of which is positioned to regulate refrigerant flow into a corresponding evaporator; a compressor that is operable to provide suction pressure to each of the evaporators and to compress refrigerant flowing from the evaporators; a plurality of pressure regulators that are operable to regulate the suction pressure at the evaporators, each pressure regulator located in a corresponding refrigeration subloop between the compressor and the refrigeration area serviced by the refrigeration subloop; a condenser that receives compressed refrigerant from the compressor; and a controller that coordinates operation of the pressure regulators with operation of the expansion valves.

Embodiments of the invention may include one or more of the following features. At least one of the refrigeration subloops may include a plurality of refrigerated areas, and each pressure regulator may be operable to ensure a uniform suction pressure at each of the evaporators in one of the refrigeration subloops. The controller may configure each expansion valve to maintain a predetermined refrigeration parameter in the corresponding refrigerated area. The predetermined refrigeration parameter may be the temperature in the refrigerated area or the temperature difference across the evaporator. The controller also may configure each expansion valve to achieve maximum refrigerant flow rate while maintaining the predetermined refrigeration parameter. The controller may configure each pressure regulator to achieve the highest suction pressure that allows each corresponding expansion valve to maintain the predetermined refrigeration parameter. The refrigeration system may include a compressor controller that determines the lowest suction pressure at which any of the pressure regulators is operating and that configures the compressor to operate at the lowest suction pressure. The controller may include a plurality of control units, each controlling one of the refrigeration subloops. Each refrigeration area in one of the subloops may have a different temperature requirement than the refrigerated areas in all other subloops.

In another aspect, the invention relates to a method of controlling a refrigeration system having refrigeration subloops, each subloop including at least one expansion valve that regulates the flow of refrigerant into a corresponding evaporator located in a refrigerated area and a pressure regulator that regulates suction pressure provided to the subloop by a compressor. The method includes the steps of adjusting each expansion valve to achieve a predetermined refrigeration parameter in the corresponding refrigerated area, and coordinating operation of the pressure regulator in each subloop with operation of each expansion valve in the subloop to maximize system efficiency.

Embodiments of the invention may include one or more of the following features. The predetermined refrigeration parameter may be temperature in the refrigerated area or temperature difference across the evaporator. The step of adjusting each expansion valve may include configuring at least one expansion valve to achieve maximum refrigerant flow rate while maintaining the predetermined refrigeration parameter in the corresponding refrigerated area. The step of coordinating the pressure regulator may include configuring the pressure regulator in each subloop to achieve the highest suction pressure possible that allows each expansion valve in the subloop to maintain the predetermined refrigeration parameter, and the method may include the steps of determining the lowest suction pressure required and configuring the compressor to operate at the lowest suction pressure.

Among the advantages of the invention are the following. The system may analyze the operation of the expansion valves and use this information to control the pressure regulators. As an expansion valve begins to close off, the corresponding pressure regulator may be adjusted to raise suction pressure, and thus saturated suction temperature, to raise the temperature in the evaporator and prevent the expansion valve from closing. In this manner, the system is able to maximize evaporator efficiency. In a sublooped refrigeration system, when all of the refrigerated areas serviced by a subloop have reached the desired refrigeration parameters, the corresponding pressure regulator may raise suction pressure to the highest possible value that still allows the subloop to maintain the desired refrigeration parameters. The compressors may then be set to provide a suction pressure no lower than that required by the pressure regulator with the lowest pressure setting, thereby maximizing overall system efficiency. Other advantages will become apparent from the following description and from the claims.

DESCRIPTION OF THE PREFERRED EMBODIMENTS

Figure 2:
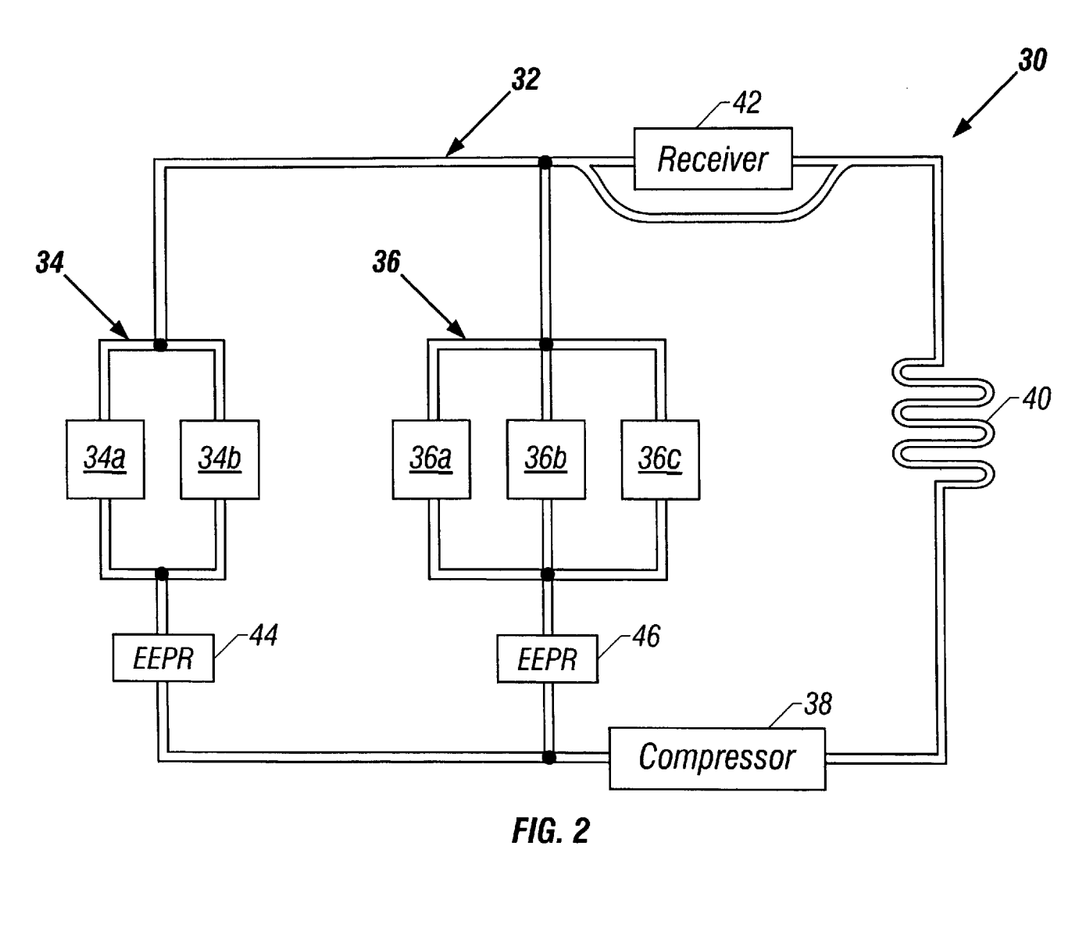
FIGS. 2 and 3 are schematic diagrams of a refrigeration system according to an embodiment of the invention.

FIG. 2 shows a refrigeration system 30 in which a main refrigeration loop 32 has a rack of compressors 38, a condenser coil 40, and a refrigerant receiver vessel 42 (to receive excess refrigerant), as well as multiple refrigeration subloops 34, 36. Each refrigeration subloop 34, 36 contains either a single refrigeration case or multiple refrigeration cases 34*a–b*, 36*a–c*. In general, all of the cases 34*a–b*, 36*a–c* in a subloop 34, 36 are maintained at approximately the same case temperature. Thus, refrigeration subloops 34, 36 are needed when several refrigeration cases 34*a–b*, 36*a–c* are to be maintained at different temperatures by a single rack of compressors 38. Each of the subloops 34, 36 also includes an electronic evaporator pressure regulator (EEPR) 44, 46, which regulates suction pressure in the cases 34*a–b*, 36*a–c* of the subloop, as described below.

In a sublooped refrigeration system, each subloop 34, 36 of cases 34*a–b*, 36*a–c* places different demands on the compressor rack 38. For example, one group of cases likely will require a suction pressure lower than that required by other cases. Thus, the compressors 38 must operate at a suction pressure low enough to satisfy the requirements of all of the subloops 34, 36. Yet the system also should allow the compressors 38 to operate at the highest possible suction pressure to maximize system efficiency. Furthermore, when several cases share a rack of compressors 38, the compressors 38 cannot shut off simply because one of the cases 34*a–b*, 36*a–c* reaches the desired case temperature. As a result, the sublooped system must provide a sophisticated control scheme to ensure efficient operation.

Figure 3:
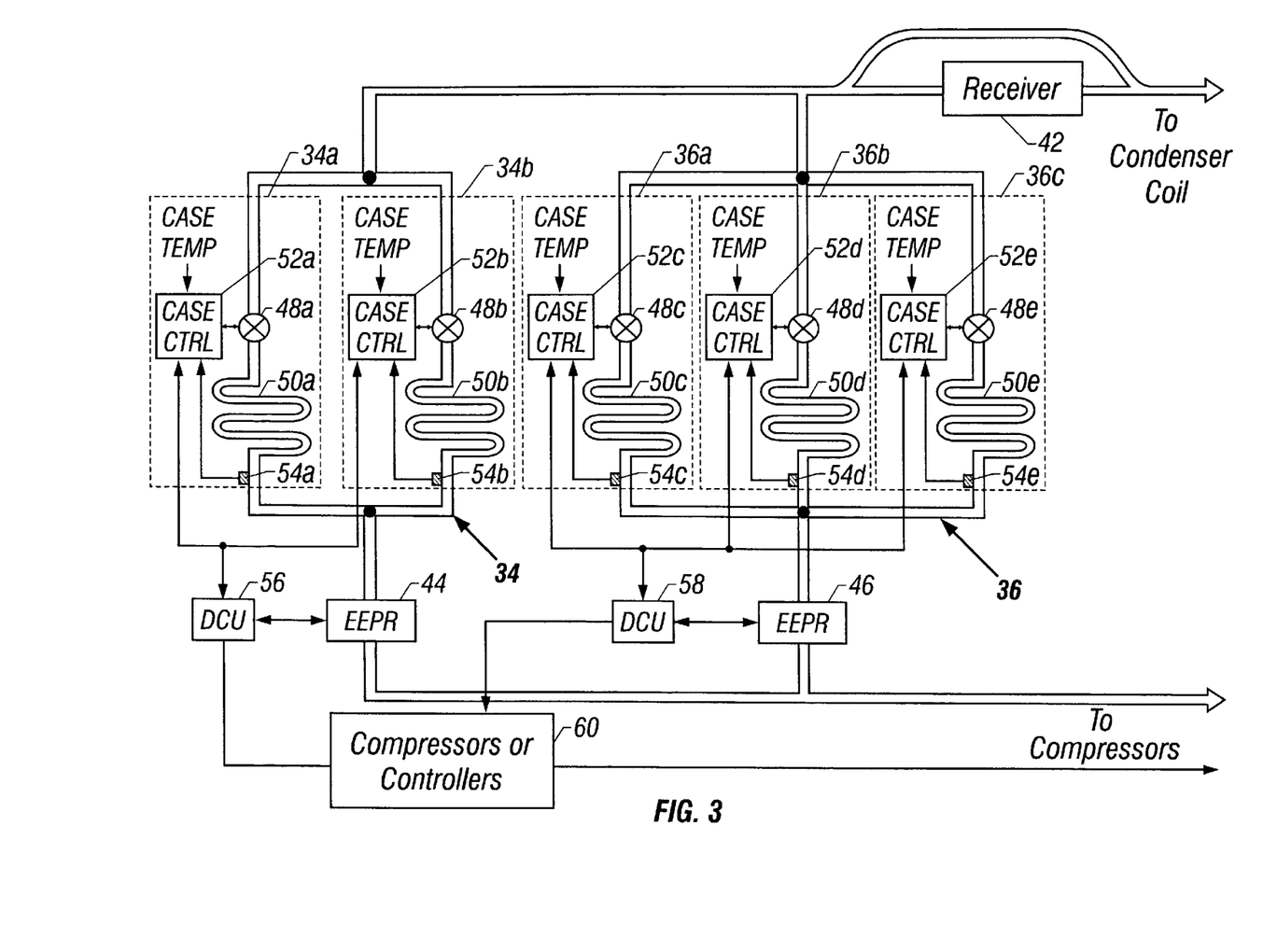

Referring now to FIG. 3, refrigerant from the receiver 42 cools the cases 34*a–b*, 36*a–c* by flowing through evaporator coils 50*a–e* in each of the cases 34*a–b*, 36*a–c*. Electronic expansion valves (EEVs) 48*a–e* control the level of refrigeration in the cases 34*a–b*, 36*a–c* by regulating the flow of fluid into the evaporator coils 50*a–e*. The EEVs may be stepper valves, which regulate the flow of refrigerant by altering the diameter of the refrigeration pipe, or they may be on/off valves, which regulate flow by opening and closing at appropriate times. Within each case 34*a–b*, 36*a–c*, a case controller 52*a–e* controls refrigeration parameters, such as case temperature and temperature difference (TD) across the coil 50*a–e*, by controlling either the orifice size (stepper valves) or the duty cycle (on/off valves) of the corresponding EEV 48*a–e*. Each of the controllers 52*a–e* receives as input the ambient temperature of the corresponding refrigeration case 34*a–b*, 36*a–c*, the temperature at the EEV 48*a–e*, and the temperature at the coil outlet, as determined by a temperature transducer 54*a–e*. Each case controller 52*a–e* also monitors the flow rate of the corresponding expansion valve 48*a–e* (i.e., the actual orifice size relative to the maximum and minimum sizes for a stepper valve, or the duty cycle of an on/off valve).

In general, when case temperature or temperature difference is too high, a case controller 52*a–e* increases the orifice size or the duty cycle of the corresponding EEV 48*a–e*; and when case temperature or temperature difference is too small, the controller 52*a–e* decreases orifice size or duty cycle. Unfortunately, when case temperature or temperature difference deviates from the desired value considerably, the controllers 52*a–e* tend to pinch off the flow of refrigerant through the EEVs 48*a–e*, thereby leading to increased system inefficiency. Case controllers and their operation are known in the art and are not described in detail here.

Each of the subloops 34, 36 also includes an EEPR 44, 46 positioned between the evaporator coils 50*a–e* and the rack of compressors 38. Each EEPR 44, 46 actively regulates the suction pressure in the cases 34*a–b*, 36*a–c* of the corresponding subloop 34, 36, under the control of a distributed control unit (DCU) 56, 58. Each DCU 56, 58 also controls the EEVs 48*a–e* in the subloop 34, 36 by communicating with the corresponding case controllers 52*a–e*. The DCUs 56, 58 monitor and adjust the EEVs 48*a–e* and EEPRs 44, 46 to ensure proper refrigeration, maximize coil efficiency, and achieve the highest possible suction pressure. Because greater orifice size or duty cycle in the EEVs 48*a–e* leads to decreased case temperature while higher suction pressure leads to increased case temperature, the DCUs 56, 58 must balance EEV flow rate against EEPR pressure to maximize operation efficiency. When the requirements for case temperature and temperature difference (TD) across the coil 50*a–e* are met for every case in a subloop 34, 36, the corresponding DCU 56, 58 raises the saturated suction temperature (SST) (i.e., the temperature at which the refrigerant evaporates at the suction pressure) for the subloop 34, 36 until one of the EEVs 48*a–e* reaches 100% flow (i.e., maximum orifice size or 100% duty cycle). The DCU 56, 58 then reports the required suction pressure to a compressor controller 60, which adjusts the compressors 38 accordingly. In this manner, each subloop 34, 36 achieves maximum efficiency while the compressors 38 run at the highest possible suction pressure.

Figure 4A:
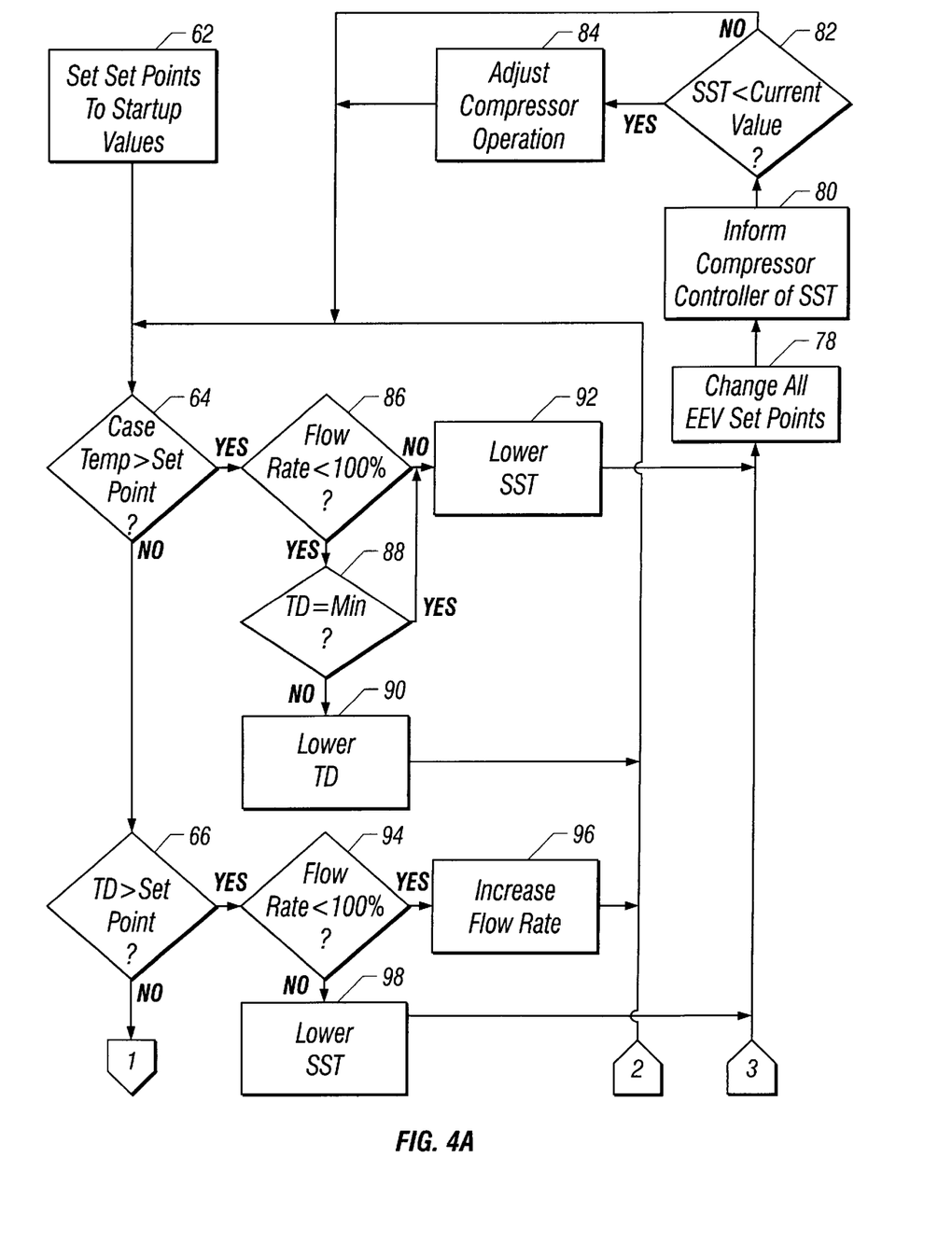
FIGS. 4A and 4B are flow diagrams for operation of the refrigeration system of FIGS. 2 and 3.
Figure 4B:
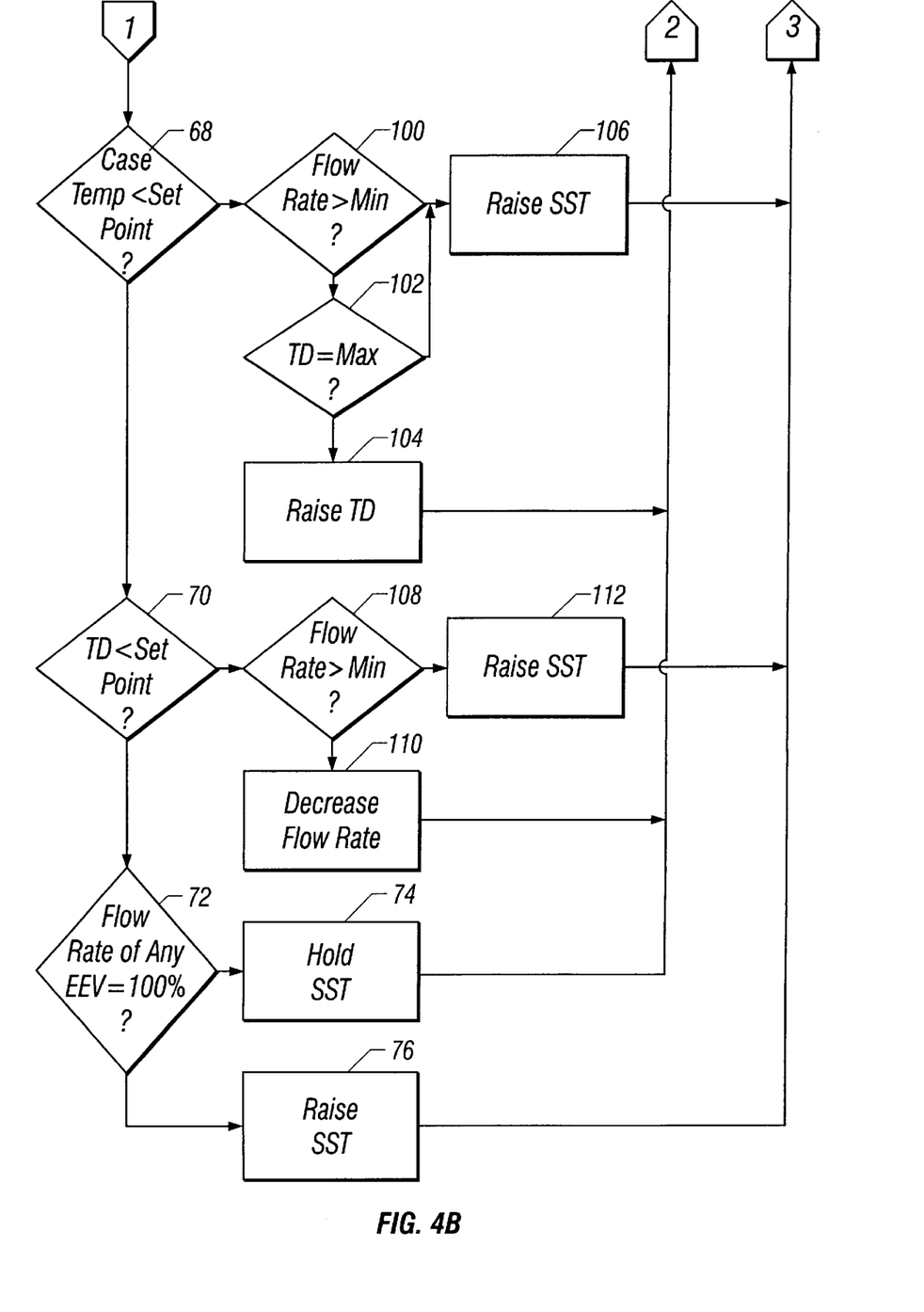

FIGS. 4A and 4B illustrate the operation of the DCUs 56, 58. When the refrigeration system starts up, the EEVs are initialized to predetermined set point values of case temperature and temperature difference, and the EEPRs are initialized to predetermined SST set point values. The startup set point values are calculated during system design as those values at which the system should achieve maximum operation efficiency. For each EEV, the set point values include a maximum TD set point and a minimum TD set point, above and below which maximum coil efficiency cannot be achieved. At startup, the TD set point is the midpoint between the maximum and minimum TD values.

When the refrigeration system is operating, each DCU periodically queries each of the case controllers for information about the performance of the corresponding EEV. This information includes the flow rate of the EEV, the relationship of the case temperature to the temperature set point, and the relationship of the TD set point to the maximum and minimum TD values. For each case, if the case temperature and the temperature difference across the coil are not above (64,66) or below (68,70) the set points, the controller determines (72) whether any of the EEVs in the subloop are at 100% flow. If one of the EEVs is at maximum flow, the DCU instructs (74) the EEPR to maintain the current SST. If all of the set points are met, but none of the EEVs are at 100% flow, the DCU instructs (76) the EEPR to raise the SST, preferably by an increment of 0.5° F. When the DCU alters the SST, it instructs (78) each of the case controllers to change the corresponding EEV set points accordingly. Thus, if an EEV's temperature set point is –5° F. and the SST is –15° F., the TD set point of the EEV would be 10° F., since the EEV would want to maintain a 10° F. differential across the evaporator coil. If the DCU were to raise the SST to –14° F., the case controller would need to lower the TD set point to 9° F. to maintain the desired temperature of 5° F. A case controller cannot, however, set the TD set point beyond the minimum or maximum value.

After the DCU instructs the case controllers to change the EEV set points, the DCU informs (80) the compressor controller of the new suction pressure requirement, as determined by the new SST. If the new suction pressure requirement is lower than that currently provided by current compressor rack (82), the compressor controller alters (84) the compressor settings to produce the reduced suction pressure requirement. If the new requirement is not lower than the current setting, the compressor controller takes no action. The DCU then continues to monitor EEV operation.

If the temperature in one of the cases in a subloop rises (64) above the set point, the DCU determines if the corresponding EEV's flow rate is less than 100% (i.e., whether the EEV's orifice size or duty cycle can be increased). If so, the DCU then determines (88) whether the EEV's TD set point is at the minimum value. If not, the DCU instructs (90) the case controller to lower the EEV's TD set point and then continues to monitor operation of all EEVs. If, on the other hand, the TD set point is already equal to the minimum, or if the EEV is already at maximum flow, the DCU instructs (92) the EEPR to lower the SST. The DCU then instructs (78) the other case controllers in the subloop to change their EEV set points and informs (80) the compressor controller of the new suction pressure requirement.

If the temperature difference across an evaporator coil rises (66) above the set point value, the DCU determines (94) whether the EEV's flow rate is less than 100%. If so, the DCU instructs (96) the case controller to increase the flow rate of the EEV and then continues to monitor all EEVs. If the temperature difference is too high and the EEV is at maximum flow, the DCU lowers (98) the SST, changes (78) the EEV set points, and informs (80) the compressor controller of the new suction pressure requirement.

When the temperature in one of the cases falls (68) below the set point value, the DCU determines (100) whether the flow rate is above a minimum level. Because the DCU is working to prevent the case controllers from shutting off refrigerant flow, it allows the case controllers to reduce orifice size or duty cycle only until flow rate falls to a certain value. If the flow rate is greater than the minimum level, the DCU determines (102) whether the TD set point is at the maximum value. If not, the DCU instructs (104) the corresponding case controller to raise the TD set point and then continues to monitor EEV operation. If the TD set point is at the maximum value, or if the flow rate is at the minimum value, the DCU instructs (106) the EEPR to raise the SST. The DCU then changes (78) the EEV set points and informs (80) the compressor controller of the new suction pressure requirement.

When the temperature difference across an evaporator coil falls (70) below the set point value, the DCU determines (108) whether the flow rate of the corresponding EEV is above the minimum. If so, the EEV's flow rate is decreased (110) and the DCU continues to monitor EEV operation. If on the other hand, the flow rate is at the minimum value, the DCU raises (112) the SST and changes (78) the EEV set points. The DCU then informs (80) the compressor controller of the new suction pressure requirement.

In this manner, the refrigeration system optimizes refrigeration efficiency within each refrigeration subloop and within the main refrigeration loop as a whole. The performance of each expansion valve in a subloop is used to regulate the suction pressure of that loop. The lowest subloop suction pressure requirement is then used to control the operation of the compressors.

Other embodiments are within the scope of the following claims. For example, the refrigeration system is not limited to use with food display cases, but rather, may be used in any environment requiring refrigeration. In addition, the functions of the distributed control units, the case controllers, and the compressor controller could be combined into one unified controller.

What is claimed is:

1. A refrigeration system comprising:
   an evaporator having an inlet and an outlet;
   a condenser;
   a compressor, located between the evaporator and the condenser, that provides suction pressure at the evaporator outlet;
   an expansion valve, connected to the evaporator inlet, that is operable to regulate a flow of refrigerant into the evaporator;
   a pressure regulator, connected to the evaporator outlet, that is operable to limit the suction pressure to a regulated value; and
   a controller that is configured to coordinate operation of the pressure regulator and the expansion valve to achieve maximum refrigerant flow rate through the expansion valve while maintaining a predetermined refrigeration parameter.

2. The refrigeration system of claim 5, wherein the predetermined refrigeration parameter comprises temperature in a refrigerated area.

3. The refrigeration system of claim 1, wherein the predetermined refrigeration parameter comprises temperature difference across the evaporator.

4. A refrigeration system comprising:
   an evaporator having an inlet and an outlet;
   a condenser;
   a compressor, located between the evaporator and the condenser, that provides suction pressure at the evaporator outlet;
   an expansion valve, connected to the evaporator inlet, that is operable to regulate a flow of refrigerant into the evaporator;
   a pressure regulator, connected to the evaporator outlet, that is operable to limit the suction pressure to a regulated value; and
   a controller that configures the expansion valve to maintain a predetermined refrigeration parameter in the refrigeration area and that configures the pressure regulator to achieve the highest possible suction pressure that allows the expansion valve to maintain the predetermined refrigeration parameter.

5. The refrigeration system of claim 4, wherein the controller coordinates operation of the compressor with operation of the pressure regulator.

6. The refrigeration system of claim 5 wherein the controller configures the compressor to provide a suction pressure no greater than the regulated value.

7. A refrigeration system comprising:
   refrigeration subloops, each comprising at least one evaporator having an inlet and an outlet and an expansion valve that is connected to the evaporator inlet and operable to regulate a flow of refrigerant into the evaporator, where at least one of the subloops includes at least two evaporators and expansion valves,
   a condenser;
   a compressor, located between the evaporators and the condenser, that provides suction pressure at the evaporator outlets;
   a pressure regulator, connected to at least one evaporator outlet, that is operable to limit the suction pressure to a regulated value;
   a controller that coordinates operation of the pressure regulator with operation of one of the expansion valves.

8. The refrigeration system of claim 7 wherein each pressure regulator is operable to ensure a uniform suction pressure at each of the evaporators in one of the refrigeration subloops.

9. A method of controlling a refrigeration system having an expansion valve that regulates a flow of refrigerant into an evaporator in a refrigerated area and a pressure regulator that regulates suction pressure provided to the evaporator by a compressor, the method comprising:

adjusting the expansion valve to achieve a predetermined refrigeration parameter in the refrigerated area;

coordinating operation of the pressure regulator and the expansion valve to achieve maximum refrigerant flow rate through the expansion valve while maintaining the predetermined refrigeration parameter.

10. The method of claim 9, wherein the predetermined refrigeration parameter comprises temperature in a refrigerated area.

11. The method of claim 9, wherein the predetermined refrigeration parameter comprises temperature difference across the evaporator.

12. A method of controlling a refrigeration system having an expansion valve that regulates a flow of refrigerant into an evaporator in a refrigerated area and a pressure regulator that regulates suction Pressure provided to the evaporator by a compressor, the method comprising:

adjusting the expansion valve to achieve a predetermined refrigeration parameter in the refrigerated area;

coordinating operation of the pressure regulator with operation of the expansion valve to maximize system efficiency; and operating the pressure regulator to achieve the highest suction pressure that allows the expansion valve to maintain the predetermined refrigeration parameter.

13. A refrigeration system having a main refrigeration loop and a plurality of refrigeration subloops, each of the refrigeration subloops servicing at least one refrigerated area, the system comprising:

a plurality of evaporators, at least one of which is located in each refrigerated area;

a plurality of expansion valves, each positioned to regulate a flow of refrigerant into a corresponding one of the evaporators;

a compressor operable to provide suction pressure to each of the evaporators and to compress refrigerant flowing from the evaporators;

a plurality of pressure regulators operable to regulate suction pressure at the evaporators, each pressure regulator located in a corresponding one of the refrigeration subloops between the compressor and the refrigerated area serviced by the refrigeration subloop;

a condenser that receives compressed refrigerant from the compressor; and a controller that coordinates operation of the pressure regulators with operation of the expansion valves.

14. The refrigeration system of claim 13 wherein at least one of the refrigeration subloops comprises a plurality of refrigerated areas.

15. The refrigeration system of claim 13 wherein the controller configures each expansion valve to maintain a predetermined refrigeration parameter in the corresponding refrigerated area.

16. The refrigeration system of claim 13 wherein the controller comprises a plurality of control units, each controlling one of the refrigeration subloops.

17. The refrigeration system of claim 13 wherein each refrigeration area in one of the subloops has a different temperature requirement than the refrigerated areas of all other subloops.

18. A refrigeration system having a main refrigeration loop and a plurality of refrigeration subloops, each of the refrigeration subloops servicing at least one refrigerated area, the system comprising:

a plurality of evaporators, at least one of which is located in each refrigerated area;

a plurality of expansion valves, each positioned to regulate a flow of refrigerant into a corresponding one of the evaporators;

a compressor operable to provide suction pressure to each of the evaporators and to compress refrigerant flowing from the evaporators;

a plurality of pressure regulators operable to regulate suction pressure at the evaporators, each pressure regulator located in a corresponding one of the refrigeration subloops between the compressor and the refrigerated area serviced by the refrigeration subloop;

a condenser that receives compressed refrigerant from the compressor; and a controller that configures each expansion valve to maintain a predetermined temperature in the refrigerated area and that coordinates operation of the pressure regulators with operation of the expansion valves.

19. A refrigeration system having a main refrigeration loop and a plurality of refrigeration subloops, each of the refrigeration subloops servicing at least one refrigerated area, the system comprising:

a plurality of evaporators, at least one of which is located in each refrigerated area;

a plurality of expansion valves, each positioned to regulate a flow of refrigerant into a corresponding one of the evaporators;

a compressor operable to provide suction pressure to each of the evaporators and to compress refrigerant flowing from the evaporators;

a plurality of pressure regulators operable to regulate suction pressure at the evaporators, each pressure regulator located in a corresponding one of the refrigeration subloops between the compressor and the refrigerated area serviced by the refrigeration subloop;

a condenser that receives compressed refrigerant from the compressor; and a controller that configures each expansion valve to maintain a predetermined refrigeration parameter in the corresponding refrigerated area and that coordinates operation of the pressure regulators with operation of the expansion valves;

wherein the controller further configures each expansion valve to achieve maximum refrigerant flow rate while maintaining the predetermined refrigeration parameter.

20. A refrigeration system having a main refrigeration loop and a plurality of refrigeration subloops, each of the refrigeration subloops servicing at least one refrigerated area, the system comprising:

a plurality of evaporators, at least one of which is located in each refrigerated area;

a plurality of expansion valves, each positioned to regulate a flow of refrigerant into a corresponding one of the evaporators;

a compressor operable to provide suction pressure to each of the evaporators and to compress refrigerant flowing from the evaporators;

a plurality of pressure regulators operable to regulate suction pressure at the evaporators, each pressure regulator located in a corresponding one of the refrigeration subloops between the compressor and the refrigerated area serviced by the refrigeration subloop;

a condenser that receives compressed refrigerant from the compressor; and a controller that configures each expansion valve to maintain a predetermined refrigeration parameter in the corresponding refrigerated area and that coordinates operation of the pressure regulators with operation of the expansion valves;

wherein the controller configures each pressure regulator to achieve the highest suction pressure that allows each corresponding expansion valve to maintain the predetermined refrigeration parameter.

21. The refrigeration system of claim 20 further comprising a compressor controller that determines the lowest suction pressure at which any of the pressure regulators is operating and that configures the compressor to operate at the lowest suction pressure.

22. A method of controlling a refrigeration system having refrigeration subloops, each subloop comprising at least one expansion valve that regulates the flow of refrigerant into a corresponding evaporator located in a refrigerated area and a pressure regulator that regulates suction pressure provided to the subloop by a compressor, comprising the steps of:

adjusting each expansion valve to achieve a predetermined refrigeration parameter in the corresponding refrigerated area, and coordinating operation of the pressure regulator in each subloop with operation of all of the expansion valves in the subloop, even if the subloop includes more than one expansion valve.

23. The method of claim 22, wherein the predetermined refrigeration parameter comprises temperature in a refrigerated area.

24. The method of claim 22, wherein the predetermined refrigeration parameter comprises temperature difference across the evaporator.

25. A method of controlling a refrigeration system having refrigeration subloops, each subloop comprising at least one expansion valve that regulates the flow of refrigerant into a corresponding evaporator located in a refrigerated area and a pressure regulator that regulates suction pressure provided to the subloop by a compressor, the method comprising:

adjusting each expansion valve to achieve a predetermined refrigeration parameter in the corresponding refrigerated area, configuring at least one expansion valve to achieve maximum refrigerant flow rate while maintaining the predetermined refrigeration parameter in the corresponding refrigerated area, and coordinating operation of the pressure regulator in each subloop with operation of each expansion valve in the subloop to maximize system efficiency.

26. A method of controlling a refrigeration system having refrigeration subloops, each subloop comprising at least one expansion valve that regulates the flow of refrigerant into a corresponding evaporator located in a refrigerated area and a pressure regulator that regulates suction pressure provided to the subloop by a compressor, the method comprising:

adjusting each expansion valve to achieve a predetermined refrigeration parameter in the corresponding refrigerated area, and configuring the pressure regulator in each subloop to achieve the highest suction pressure possible that allows each expansion valve in the subloop to maintain the predetermined refrigeration parameter.

27. The method of claim 26, further comprising the steps of determining the lowest suction pressure required and configuring the compressor to operate at the lowest suction pressure.

28. A refrigeration system comprising:

a main refrigeration loop having multiple compressors and a condenser;

a plurality of refrigeration subloops, each of which services at least one refrigerated area and at least one of which services a plurality of refrigerated areas, each of the plurality of refrigerated areas having a different temperature requirement than the refrigerated areas of all other subloops;

a plurality of evaporators, at least one of which is located in each refrigerated area, each evaporator having an outlet that receives a suction pressure produced by the compressor;

a plurality of electronic expansion valves, each positioned to regulate refrigerant flow into a corresponding one of the evaporators;

a plurality of electronic pressure regulators operable to regulate suction pressure at the evaporator outlets, each electronic pressure regulator located in one of the refrigeration subloops between the rack of compressors and the refrigerated areas serviced by the subloop;

a controller a) that uses an actual value of temperature in each refrigerated area and an actual value of temperature difference across each corresponding evaporator to configure the corresponding expansion valve to maintain a predetermined value of temperature in the refrigerated area and a predetermined value of temperature difference across the evaporator, and b) that configures each of the electronic pressure regulators to achieve the highest suction pressure that allows each of the electronic expansion valves in the corresponding refrigeration subloops to achieve the predetermined values and that allows at least one of the electronic expansion valves to achieve maximum refrigerant flow rate; and a compressor controller that determines the lowest suction pressure at which any of the electronic pressure regulators is operating and that configures the rack of compressors to operate at the lowest suction pressure.

29. A refrigeration system having a main refrigeration loop and a plurality of refrigeration subloops, each of the refrigeration subloops servicing at least one refrigerated area, the system comprising:

a plurality of evaporators, at least one of which is located in each refrigerated area;

a plurality of expansion valves, each positioned to regulate a flow of refrigerant into a corresponding one of the evaporators;

a compressor operable to provide suction pressure to each of the evaporators and to compress refrigerant flowing from the evaporators;

a plurality of pressure regulators operable to regulate suction pressure at the evaporators, each pressure regulator located in a corresponding one of the refrigeration subloops between the compressor and the refrigerated area serviced by the refrigeration subloop;

a condenser that receives compressed refrigerant from the compressor; and a controller that configures each expansion valve to maintain a predetermined temperature difference across the evaporator and that coordinates operation of the pressure regulators with operation of the expansion valves.

* * * * *